Dec. 23, 1930.  E. WERNER  1,785,754
HAND SCRAPER
Filed May 10, 1930
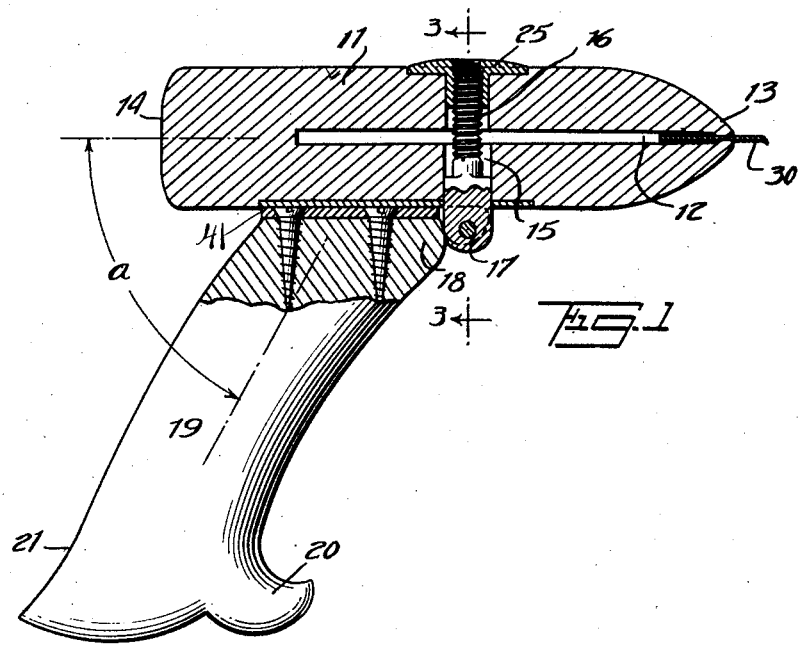
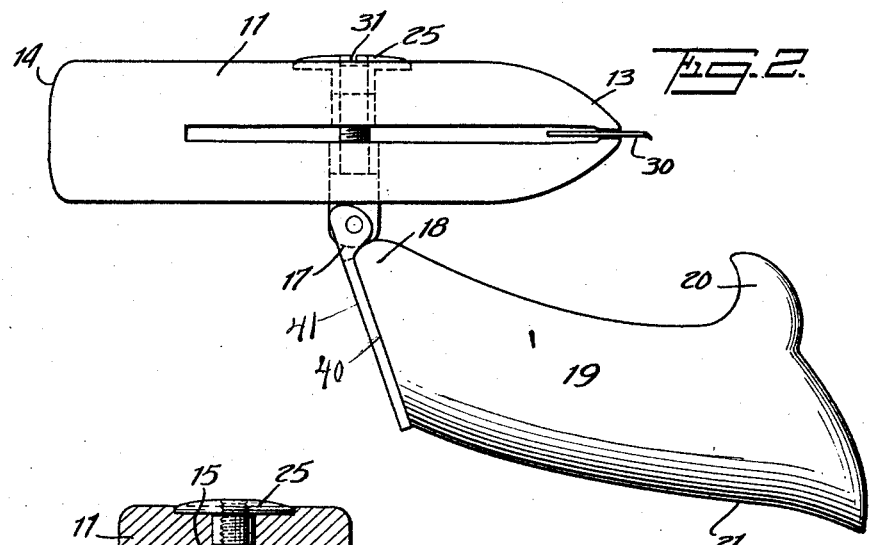
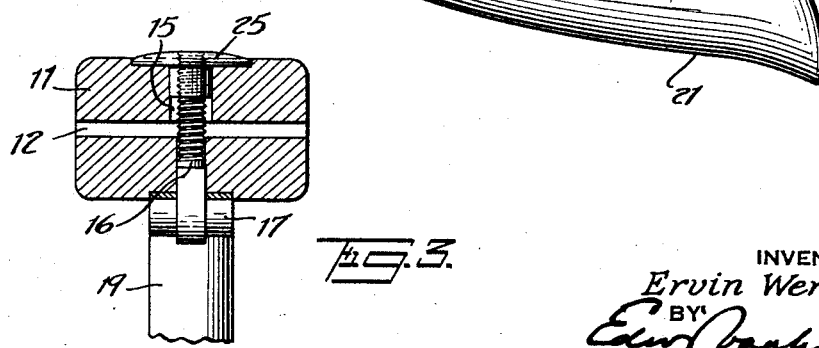
INVENTOR
Ervin Werner
BY
ATTORNEY Patented Dec. 23, 1930

1,785,754

UNITED STATES PATENT OFFICE

ERVIN WERNER, OF BROOKLYN, NEW YORK

HAND SCRAPER

Application filed May 10, 1930. Serial No. 451,297.

My invention relates to hand scrapers, more particularly to those used for surfacing floors and has for its object the production of a novel, simple and efficient scraper provided with means for automatically clamping and holding the blade in adjusted position for use.

A further object is to provide a scraper where old blades can be quickly removed and new blades put into place without the use of any tools.

A still further object is to provide a scraper that will grasp and hold any size blade, the adjustment being made with the blade itself.

The foregoing and other features of my invention will now be described in connection with the accompanying drawing forming part of this application in which I have represented my hand scraper in its preferred form, after which I shall point out in the claims those features which I believe to be new and of my own invention.

In the drawings:

Figure 1 is a side elevation in part section showing the blade held in its working position.

Figure 2 is a side elevation of my scraper with the blade loose and ready for change.

Figure 3 is a section along the line 3—3, Figure 1.

In the carrying out of my invention I provide a main frame 11 which may either be saw cut as shown at 12 or the frame may be made of two pieces and fastened together. The saw cut is made in the toe 13 of the frame and the opposite end 14 is conveniently shaped to accommodate the left hand of the person using the scraper. Substantially mid-way between the toe 13 and the end 14 is a hole 15 which accommodates the screw 16 attached to the hinge 17 which is fastened to the toe 18 of the handle portion 19. The handle portion is conveniently fashioned so that the hand will securely grip and hold it. I have shown a typically formed handle with curved end 20 which engages the fingers while the curved end 21 fits the curvature of the closed palm of the operator's hand. This saw grip handle which comprises a palm gripping portion and a finger gripping portion is also provided with a flat portion 40 which makes an acute angle with the finger gripping portion. On this flat portion I secure my hinge plate 41 which has on the end adjacent the apex of the acute angle a cam which is pivoted to the screw 16. This hinge plate 41 forms a base for the hinge construction and abuts against the head or main frame 11 when in working position. It will be noticed that with this construction, any pull on the handle tends to rotate the head around the pivot point 17 causing the cutter to take hold more readily.

The articulated cam connection is fastened at the toe 18 of the handle and when in position shown in Figure 1 tightens the toggle 17 which is adjusted by screwing the nut 25 up on the thread of the toggle screw 16.

The blade 30 is held in the saw cut when the toggle clamp is in position shown in Figure 1 and is loose when toggle clamp is in position shown in Figure 2.

A slot 31 is cut in the nut 25 adapted to receive the blade 30 by means of which the length of the toggle adjustment is regulated.

The shape of the frame and handle is such that the angle $a$ when in operating position is between 45 and 65 degrees so that the scraper will dig into the wood without applying extra pressure to heel 14. This is very important because by this construction the actual physical labor is reduced, as compared with other scrapers now on the market.

I wish it distinctly understood that my hand scraper herein illustrated and described is in the form in which I desire to construct it, but that changes or variations may be made as may be convenient or desirable without departing from the salient features of my invention and I therefore intend the following claims to cover such modifications as naturally fall within the lines of invention.

I claim:

1. A hand scraper, in combination a blade, a head provided with a slot in one end for receiving a blade and on the other end a hand grip, a hole at right angles to the slot, a handle provided with a heel and a toe having a hingle plate fastened thereto, a stud hinged to the plate and passing through the hole in the head, a nut on the screw, the stud so hinged to the plate that the slot will be decreased when the heel of the handle contacts with the head.

2. The device of claim 1 includes means for adjusting the nut on the screw with the blade.

3. A hand scraper in combination, a blade, a head provided with a slot in one end for receiving the blade, a handle connected to the head through an articulated cam connection, means to adjust the articulated connection so that a part of the handle engages the head away from the blade when the blade is in working position so that the blade is held within the head with a predetermined pressure.

4. A hand scraper in combination, a blade, a head provided with a slot in one end for receiving the blade, a saw grip handle connected to the head through an articulated cam connection so that a part of the handle rests against the head on the end away from the blade whereby a pull on the handle exerts a pressure on the end of the head away from the blade.

5. A hand scraper in combination, a blade, a head provided with a slot in one end for receiving the blade, a saw grip handle comprising a palm gripping portion and a finger gripping portion, said handle having a flat surface making an acute angle with the finger gripping portion, an articulated cam connection connecting the point of the acute angle on the handle to the head to bring the slot in close contact with the blade when the flat surface is abutting the head portion.

In testimony whereof I affix my signature.

ERVIN WERNER.